United States Patent [19]
Sato et al.

[11] Patent Number: 5,992,004
[45] Date of Patent: Nov. 30, 1999

[54] METHOD FOR PRODUCING A THIN FILM MAGNETIC HEAD

[75] Inventors: Kiyoshi Sato; Yoshihiko Kakihara; Masamichi Saito; Toshihiro Kuriyama; Toshinori Watanabe, all of Niigata-ken, Japan

[73] Assignee: Alps Electric Co., Ltd., Tokyo, Japan

[21] Appl. No.: 08/833,405

[22] Filed: Apr. 4, 1997

Related U.S. Application Data

[62] Division of application No. 08/616,114, Mar. 14, 1996, Pat. No. 5,923,503.

[30]   Foreign Application Priority Data

Mar. 15, 1995   [JP]   Japan ........................ 7-83167
Sep. 5, 1995    [JP]   Japan ........................ 7-228095

[51] Int. Cl.⁶ .................................................. G11B 5/42
[52] U.S. Cl. ........................... 29/603.14; 29/603.15; 427/131; 360/113
[58] Field of Search .......................... 29/603.08, 603.14, 29/603.15; 360/113; 427/131, 132

[56]   References Cited

U.S. PATENT DOCUMENTS 5,018,037   5/1991   Krounbi et al. ........................ 360/113
5,315,468   5/1994   Lin et al. ............................ 360/113

*Primary Examiner*—Carl E. Hall
*Attorney, Agent, or Firm*—Brinks Hofer Gilson & Lione

[57]   ABSTRACT

A longitudinal bias layer and an electrode layer are formed on a non-magnetic material layer. The longitudinal bias layer and the electrode layer are partially removed by an etching technique so that a narrow gap defining the track width Tw is formed in the longitudinal bias layer and the electrode layer. Furthermore, a three-layer film consisting of, from bottom to top, a magnetoresistance effect layer, a non-magnetic layer, and a transverse bias layer, or otherwise a spin valve film consisting of a free magnetic layer, a non-magnetic layer, a fixed magnetic layer and a bias layer is formed on the above structure. The three-layer film or the spin valve film is then partially removed by an etching technique so that the three-layer film or the spin valve film remains only in the above-described narrow gap formed in the longitudinal bias layer and the electrode layer. The shape of the side walls of the three-layer film or the spin valve film is precisely determined by the side walls of the longitudinal bias layer and the electrode layer. The resultant three-layer film or the spin valve film exhibits excellent magnetic detection characteristics. Furthermore, the longitudinal bias layer has good magnetic coupling with the magnetoresistance effect layer.

5 Claims, 13 Drawing Sheets

METHOD FOR PRODUCING A THIN FILM MAGNETIC HEAD

This application is a division of application Ser. No. 08/616,114, filed Mar. 14, 1996, now U.S. Pat. No. 5,923,503.

BACKGROUND OF THE INVENTION

1. Field of the Invention

The present invention relates to a thin-film magnetic head for use for example as a floating type magnetic head in a hard disk device, which is designed to detect, by means of the magnetoresistance effect, a leakage magnetic flux coming from a recording medium, and more particularly to a thin-film magnetic head having a plurality of layers, which can be formed easily, and exhibiting improved performance in terms of detecting a magnetic field, and furthermore to a production method thereof.

2. Description of the Prior Art

FIGS. 12A to 12D are schematic diagrams illustrating a production method of a conventional thin-film magnetic head based on the magneto-resistance effect. FIG. 13 is an enlarged sectional view illustrating a part (the portion denoted by reference symbol XIII in FIG. 12D) of a thin-film magnetic head obtained after completion of the production process.

In a conventional method of producing a thin-film magnetic head, as shown in FIG. 12A, a three-layer film 2 is deposited, by means of for example a sputtering technique, on a non-magnetic material layer (lower gap layer) 1 such as $Al_2O_3$ formed on a lower shielding layer. As shown in an enlarged fashion in FIG. 13, the bottom layer of the three-layer film 2 serves as a transverse bias layer 2a for generating a transverse bias field. The transverse bias layer 2a is a soft magnetic layer (SAL) made of a soft magnetic material such as an Fe—Ni—Nb (iron-nickel-niobium) alloy. The layer disposed on the transverse bias layer 2a is a non-magnetic layer (shunt layer) 2b made of for example Ta (tantalum). The top layer is a magnetoresistance effect layer (MR layer) 2c. The magnetoresistance effect layer 2c is made of for example a Ni—Fe alloy.

A resist material is coated on the three-layer film 2 shown in FIG. 12A, and then subjected to an exposing and developing process using a deep-UV technique or the like thereby forming a resist layer 3 having a shape such as that shown in FIG. 12B. As shown in FIG. 12B, the resist layer 3 has undercuts 3a, 3a formed at its lower positions on both sides. The track width (TW) of the thin-film magnetic head is determined by the dimension of the resist layer 3.

The three-layer film 2, except regions on which the resist layer 3 is formed, is then removed using an etching technique such as an ion milling technique, as shown in FIG. 12C. In this etching process, both sides of the three-layer film 2 are removed, and slanted planes (i) are produced. A longitudinal bias layer (hard bias layer) 4 and an electrode layer 5 are then sputtered using the resist layer 3 as a mask so that these layers are formed only in the regions in which the three-layer film 2 is not formed. In the regions near the contacting interface between the three-layer 2 and the longitudinal layer 4 and the electrode layer 5, the thickness of the longitudinal layer 4 and the electrode layer 5 changes in such a manner as shown in FIG. 13 due to the undercuts 3a, 3a formed on the sides of the resist layer 3.

After the resist layer 3 is removed, an upper gap of a non-magnetic material such as $Al_2O_3$ is formed on the resultant multi-layer structure shown in FIG. 12D, and furthermore an upper shielding layer is formed thereon.

In this thin-film magnetic head, the longitudinal bias layer 4 is a so-called hard bias layer or a hard magnetic layer made of for example Co—Pt (cobalt-platinum) alloy. The magnetoresistance effect layer 2c is magnetized in the X-direction into a single magnetic domain by a magnetic field maintained in the longitudinal bias layer 4. If a detection current is supplied to the magnetoresistance effect layer 2c from the electrode layer 5 via the longitudinal bias layer 4, a magnetic field is induced in the magnetoresistance effect layer 2c by the current, and thus the transverse bias layer 2a experiences a magnetic field in the Y-direction originating from the magnetoresistance effect layer 2c. As a result, the transverse bias layer 2a pinned magnetic layer is magnetized in the Y-direction. The transverse bias field in the Y-direction in this transverse bias layer 2a is applied to the magnetoresistance effect layer 2c, and thus the uniform magnetization performed by the longitudinal bias field and the transverse bias field ensure the linearity of the detection output relative to the change in the leakage magnetic field in the Y-direction applied from a recording medium.

FIG. 14 is a front view of a conventional thin-film magnetic head of the spin valve type. The magnetic recording medium such as a hard disk moves in the Z-direction relative to this thin-film magnetic head, while the leakage magnetic field (external magnetic field) from the magnetic recording medium occurs in the Y-direction. The thin-film magnetic head shown in FIG. 14 includes a non-magnetic material layer (lower gap layer) 1 formed of a non-magnetic material such as $Al_2O_3$(aluminum oxide), and a spin valve layer (SV) formed on the non-magnetic material layer, wherein the spin valve layer consists of 6 layers including a lower non-magnetic layer 20 such as a Ta (tantalum), free magnetic layer 21, non-magnetic conductive layer 22, fixed magnetic layer (pinned magnetic layer) 23, antiferromagnetic layer 24, and upper non-magnetic layer 25 such as Ta.

The lower non-magnetic layer 20 ensures that the free magnetic layer 21 formed on the lower non-magnetic layer 20 can have uniform crystal orientation, and can have a low specific resistance. The free magnetic layer 21 and the fixed magnetic layer 23 are made of a Ni—Fe (nickel-iron) alloy. The antiferromagnetic layer 24 is a bias layer for making the magnetization of the fixed magnetic layer 23 uniformly occur in the Y-direction. That is, anisotropic exchange coupling occurs at the interface between the antiferromagnetic layer 6 and the fixed magnetic layer 23, and as a result the fixed magnetic layer 23 is magnetized in the Y-direction (in the upward direction perpendicular to the drawing plane of FIG. 14) into a single magnetic domain. The antiferromagnetic layer 24 is made of an alloy such as Fe—Mn (iron-manganese), Ni—Mn (nickel-manganese), or Pt—Mn (platinum-manganese).

A longitudinal bias layer 4 such as a Co—Pt (cobalt-platinum) alloy is formed on both sides of the spin valve layer SV having the 6-layer structure described above in such a manner that the longitudinal bias layer is in contact at the contacting interface (V) with all six layers constituting the spin valve layer SV. On the longitudinal bias layer 4, there is further disposed a layer made of a material having a small specific resistance, such as Cu (copper), Ta, or Cr (chromium).

In this thin-film magnetic head of the spin valve type, the longitudinal bias layer 4 is permanently magnetized in the X-direction, and the free magnetic layer 21 is magnetized in the X-direction by a magnetic field from the permanently magnetized longitudinal bias layer 4. The fixed magnetic layer 23 is magnetized in the Y-direction (the upward direction perpendicular to the drawing plane) by the antiferromagnetic layer 24. A steady-state current flows from the electrode layer 5 to the longitudinal bias layer 4 and further into the spin valve layer SV having the six-layer structure in the X-direction. If a magnetic field in the Y-direction is applied from a magnetic recording medium, the magnetization direction of the free magnetic layer 21 is inverted by this external magnetic field from the X-direction to the Y-direction. The electric resistance of the spin valve layer SV changes depending on the relationship between the magnetization direction of the free magnetic layer 21 and the magnetization direction of the fixed magnetic layer 23. Therefore, it is possible to detect the leakage magnetic field from the magnetic recording medium by detecting the voltage drop associated with the steady-state current.

The thin-film magnetic head shown in FIG. 14 can be produced as follows. First, the lower non-magnetic layer 20, free magnetic layer 21, non-magnetic conductive layer 22, fixed magnetic layer 23, antiferromagnetic layer 24, and upper non-magnetic layer 25 are successively sputtered on the non-magnetic material layer 1 thereby forming the spin valve layer SV consisting of these six layers. The spin valve layer SV is coated with a resist material. The resist is exposed to for example deep-UV light, and then developed so that a resist pattern having a width corresponding to the track width (TW) is formed on the spin valve layer SV. Using the resist pattern as a mask, The spin valve layer SV is etched by means of for example an ion milling technique thereby removing the portions of the spin valve layer which are not covered with the resist pattern. In this etching process, the shape of the resist layer formed by the deep-UV exposure and development process affects the shape of the cross section of the resultant spin valve layer SV and thus the width between one contacting face (V) and the other contacting face (V) increases with the contacting position approaching the bottom layer.

The longitudinal bias layer 4 is then formed by performing sputtering using the resist layer remaining on the spin valve layer SV as a mask. Due to the shape of the resist pattern, the thickness of the longitudinal bias layer 4 in the vicinities of the contacting interfaces (V) decreases with the contacting position approaching the top layer as shown in FIG. 14. Except for the vicinities of the contacting interfaces (V), the longitudinal bias layer 4 has a substantially constant thickness. The electrode layer 5 is then formed on the longitudinal bias layer 4.

The thin-film magnetic head having the structure shown in FIG. 13 which is produced according to the process shown in FIGS. 12A to 12D has problems as described below.

(a) In this thin-film magnetic head, the three-layer film 2 and the longitudinal bias layer 4 are in contact at the slanted plane (j) with each other. However, since the magnetoresistance effect layer 2c is located at the top and the longitudinal bias layer 4 is located at the bottom, the longitudinal bias layer 4 in the region (ii) is not parallel to the magnetoresistance effect layer 2c extending in the X-direction. In order for the longitudinal bias layer 4 extending in a slanted direction to magnetize the magnetoresistance effect layer 2c in the X-direction into a single magnetic domain along the plane (i), it is required that the longitudinal bias layer 4 have isotropic magnetic characteristics. To achieve the isotropic characteristics, it is required to form the longitudinal bias layer 4 without introducing magnetic strain. However, this requires difficult sputtering conditions.

(b) The angle and the length L in the X-direction of the slanted plane (i) of the three-layer film 2, and the thickness and the shape of the longitudinal bias layer 4 in the region (ii) are all affected by the shape of the resist layer 3 formed in the process shown in FIG. 12B. The shape of the resist layer 3 is determined by the exposure and the development conditions, and there is a great variation in the shape of the resist layer 3, in particular the shape of the undercuts 3a, 3a. Therefore, it is very difficult to obtain thin-film magnetic heads having small variations from product to product in terms of the angle and the length L of the slanted plane (i) of the three-layer film 2 and the thickness and the shape of the longitudinal bias layer 4 in the region (ii).

(c) Due to the variations in the shape of the resist layer 3, practical thin-film magnetic heads have a small slanting angle of the plane (i) and a great length L in the X-direction. However, if the length L of the slanted plane (i) increases, the transverse bias layer (soft magnetic layer) 2a will have longer portions at its both ends which do not face the magnetoresistance effect layer 2c. The portions of the transverse bias layer 2a extending in the X-direction beyond the ends of the magnetoresistance effect layer 2c are difficult to magnetize in the Y-direction by the magnetoresistance effect layer 2c. As a result, the portions (i) of the transverse bias layer 2a have an independent sensitivity to a leakage magnetic field from a recording medium. This sensitivity affects the detection current, and can be a cause of Barkhausen noise.

(d) When the longitudinal bias layer 4 is formed by performing sputtering using the resist layer 3 as a mask, the material for the longitudinal bias layer has to penetrate into the spaces under the undercuts 3a, 3a of the resist layer 3. Therefore, the deposition rate of the film in these regions is slow, and a great variation occurs in the thickness of the resultant film. In practical production process of thin-film magnetic heads, the longitudinal bias layer 4 is deposited, with the low deposition rate and the thickness variation in these spaces being taken into account. As a result, the portion of the longitudinal bias layer 4 which is not in contact with the three-layer film 2 (or the portion on which resist layer 3 is not present) has an unnecessarily great thickness. This results in a long production time. Furthermore, the total thickness of the magnetic head becomes great. The gap length of the thin-film magnetic film is determined by the thickness of the non-magnetic material layer serving as the lower gap layer and by the thickness of the lower gap layer formed on the three-layer film 2. In recent magnetic heads of this type, it is required to reproduce a signal recorded at a high density and thus a smaller gap length is required. However, if the thickness of the longitudinal bias layer 4 becomes unnecessarily great, the gap length inevitably becomes greater. As a result, it becomes impossible to meet the requirement of the high-density signal reproduction.

On the other hand, the thin-film magnetic head having the structure shown in FIG. 14 has problems described below.

(e) In the conventional structure shown in FIG. 13, since the electrode layer 5 and the longitudinal bias layer 4 are in contact at the slanted plane (i) with the three-layer film 2, the detection current flows from the electrode layer 5 via the longitudinal bias layer 4 not only into the magnetoresistance effect layer 2c but also partly into the transverse bias layer 2a.

(f) In order for the free magnetic layer 21 to be magnetized in the X-direction by the longitudinal bias layer 4, it is required that the longitudinal bias layer 4 can be uniformly magnetized in the X-direction. However, in the regions on the contacting interfaces (V), the thickness (dimension in the X-direction) of the longitudinal bias layer 4 changes in such a manner that the longitudinal bias layer 4 goes up the spin valve layer SV. As a result, it is difficult to uniformly magnetize the longitudinal bias layer 4 in the X-direction. One reason is that in these regions in which the thickness of the longitudinal bias layer 4 changes in the above-described a manner, when an attempt is made to magnetize the longitudinal bias layer 4 in the X-direction, demagnetization occurs randomly in the direction and magnitude. This makes it difficult to magnetize the longitudinal bias layer 4 in the X-direction. Another reason is that since the longitudinal bias layer 4 is in contact with all six layers constituting the spin valve layer SV, the magnetic characteristics of the longitudinal bias layer 4 near the contacting plane (V) change from part to part in response to the changes in the material of the spin valve layer from layer to layer. For these reasons, it becomes difficult to uniformly magnetize the longitudinal bias layer 4 into the X-direction. As a result, the degree of magnetization of the free magnetic layer 21 in the X-direction into a single magnetic domain becomes low, and Barkhausen noise becomes great.

(g) The longitudinal bias layer 4 is in contact with both sides of each of the fixed magnetic layer 23 and the antiferromagnetic layer 24. As a result, the permanently-magnetized longitudinal bias layer 4 exerts great magnetic influences on the fixed magnetic layer 23 and antiferromagnetic layer 24 of the spin valve layer SV. Thus, the fixed magnetic layer 23 is not uniformly magnetized in the Y-direction and great Barkhausen noise occurs.

(h) In order for the free magnetic layer 21 to receive a sufficiently large magnitude of magnetic field from the bias layer 4, it is required that the upper surface 4a of the longitudinal bias layer 4 is located at a position higher than the position of the upper surface of the free magnetic layer 21. To meet this requirement, it is necessary to perform a sputtering process for a long time so that the longitudinal bias layer 4 has a sufficiently large thickness.

SUMMARY OF THE INVENTION

It is a general object of the present invention to solve the problems described above. More specifically, it is an object of the present invention to provide a thin-film magnetic head having an improved structure in which a magnetoresistance effect layer is in contact with a longitudinal bias layer in an improved manner thereby preventing degradation in characteristics such as an increase in the Barkhausen noise.

It is another object of the present invention to provide a method of producing a thin-film magnetic head which makes it possible to precisely form fine structures such as a contacting part at which a three-layer film is in contact with a longitudinal bias layer. It is still another object of the present invention to provide a thin-film magnetic head and a production method thereof which offer stable magnetization of a hard bias layer magnetized thereby ensuring that a free magnetic layer is magnetized in a more reliable fashion.

In one aspect of the present invention, there is provided a thin-film magnetic head including a pair of longitudinal bias layers spaced a predetermined distance apart in the same plane; three layers including, from bottom to top, a magnetoresistance effect layer, a non-magnetic layer, and a transverse bias layer, formed in the space between the pair of longitudinal bias layers; and electrode layers formed on the respective longitudinal bias layers, the electrode layers being disposed at both sides of the three layers.

In the thin-film magnetic head described above, it is desirable that there is provided a tantalum film having bcc (body-centered cubic) crystal structure, serving as an underlying film disposed under the magnetoresistance effect layer.

According to another aspect of the present invention, there is provided a method of producing a thin-film magnetic head, including the steps of: forming a longitudinal bias layer and then an electrode layer thereon; partially removing the longitudinal bias layer and electrode layer in such a manner as to form a narrow space having a predetermined width in the longitudinal bias layer and electrode layer; successively forming three layers including, from bottom to top, a magnetoresistance effect layer, a non-magnetic layer, and a transverse bias layer, in the space formed in the above-described partially removing step and also on the electrode layer; and removing the three layers on the electrode layer except for the portion in the above-described space.

According to a further aspect of the invention, there is provided a method of producing a thin-film magnetic head, including the steps of: forming a longitudinal bias layer; partially removing the longitudinal bias layer in such a manner as to form a narrow space having a predetermined width in the longitudinal bias layer; successively forming three layers including, from bottom to top, a magnetoresistance effect layer, a non-magnetic layer, and a transverse bias layer, in the space formed in the above-described partially removing step; removing the three layers on the longitudinal bias layer except for the portion in the above-described space; and forming an electrode on the longitudinal bias layer.

In the above method, the electrode layer may be formed in such a manner that the electrode layer separated from the three layers. Furthermore, in the above method, a layer may be formed on the longitudinal bias layer using the same material as that of the longitudinal bias layer so that the above-described layer is in contact with the three layers, and then the electrode layer is formed on the above-described layer.

According to still another aspect of the invention, there is provided a thin-film magnetic head of the spin valve type, including: a free magnetic layer, a non-magnetic layer, and a fixed magnetic layer; a longitudinal bias layer disposed at both sides of the free magnetic layer, for magnetizing the free magnetic layer into a predetermined direction; a bias layer disposed on the fixed magnetic layer, for magnetizing the fixed magnetic layer into a direction crossing the direction in which the free magnetic layer is magnetized; wherein only the free magnetic layer is in contact with the contacting interfaces of the longitudinal bias layer disposed at both sides of the free magnetic layer.

In the above thin-film magnetic head, it is preferable that the contacting interfaces be slanted in such a manner that the distance between the contacting interfaces increases with the position in the longitudinal bias layer from bottom to top, and it is also preferable that the longitudinal bias layer has a substantially constant thickness in regions near the contacting interfaces and also in the other region.

According to still another aspect of the invention, there is provided a method of producing a thin-film magnetic head of the spin valve type, including the steps of: forming first a longitudinal bias layer and an electrode layer; partially removing the electrode layer and longitudinal bias layer; forming a free magnetic layer, a non-magnetic layer, a fixed magnetic layer, and a bias layer, in the space created by partially removing the electrode layer and longitudinal bias layer, the bias layer magnetizing the fixed magnetic layer into a direction crossing the direction in which the free magnetic layer is magnetized, wherein the free magnetic layer is formed in such a manner that only the free magnetic layer comes in contact with the longitudinal bias layer.

In the thin-film magnetic head of the spin valve type according to the present invention, the longitudinal bias layer is in contact at the contacting interfaces only with the free magnetic layer. This ensures that the longitudinal bias layer can magnetize the free magnetic layer in a reliable manner, and also ensures that magnetic layers such as the fixed magnetic layer other than the free magnetic layer are not affected by the magnetic field from the longitudinal bias layer.

Furthermore, the uniform thickness of the longitudinal bias layer results in a reduction in the variations in the magnitudes and directions of demagnetizing field, and thus the longitudinal bias layer is entirely magnetized into the same direction. Furthermore, in this invention, it is possible to apply a sufficiently strong of magnetic field to the free magnetic layer without having to increase the thickness of the longitudinal bias layer to an unnecessarily great value.

In the method of producing a thin-film magnetic head according to the present invention, a longitudinal bias layer is formed before forming a spin valve layer including free magnetic layer and a fixed magnetic layer. This makes it possible to obtain a longitudinal bias layer having a uniform thickness. It is desirable that there be provided an underlying film of Cr (chromium) under the longitudinal bias layer thereby improving the magnetic characteristics of the longitudinal bias layer. Furthermore, in the production method according to the present invention, the longitudinal bias layer is partially removed, and then a free magnetic layer, a non-magnetic layer, and a fixed magnetic layer are successively formed in the space produced by partially removing the longitudinal bias layer so that only the free magnetic layer is in contact at the contacting interfaces with the longitudinal bias layer.

DESCRIPTION OF THE PREFERRED EMBODIMENTS

The invention will be described in further detail with reference to specific embodiments.

Figure 1A:
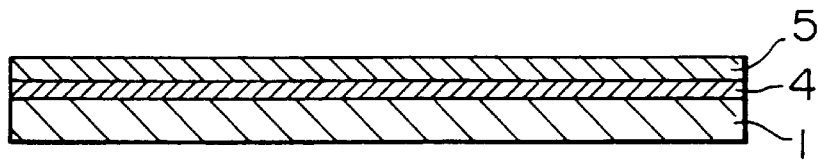
FIGS. 1A to 1F are cross-sectional views illustrating a production flow of a thin-film magnetic head according to a first embodiment of the present invention.
Figure 1B:
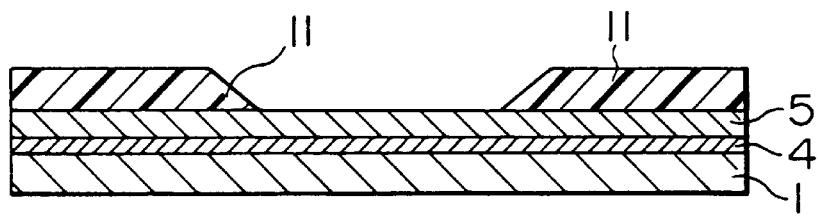
Figure 1C:
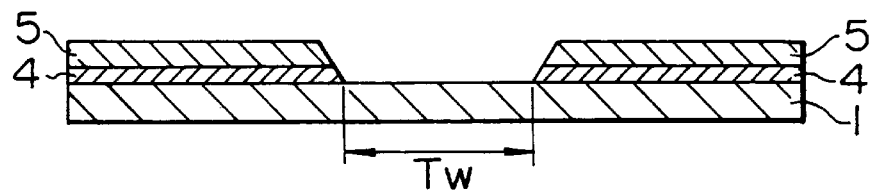

FIGS. 1A to 1F are a cross-sectional views illustrating a production flow of a thin-film magnetic head according to a first embodiment of the present invention. FIG. 2A is a cross-sectional view of a completed thin-film magnetic head, while the part denoted by IIB in FIG. 2A is shown in an enlarged fashion in FIG. 2B.

In the first embodiment, a thin-film magnetic head is produced as follows. First, as shown in FIG. 1A, a non-magnetic material layer (lower gap layer) 1 as $Al_2O_3$ is formed on a lower shielding layer (not shown), and then a longitudinal bias layer 4 and an electrode layer 5 are successively formed thereon. In a later process step, a magnetic field is applied to the longitudinal bias layer 4 so that the magnetic field is held in the longitudinal bias layer and thus the longitudinal bias layer acts as a hard bias layer. The longitudinal bias layer 4 is made of a hard magnetic material such as a Co—Pt alloy. The electrode layer 5 is made of a material having a low specific resistance such as tantalum (Ta) or chromium (Cr).

A resist material is then coated on the electrode layer 5 by means of for example spin coating. The resist material is pre-baked, and then exposed to light through a mask. The resist is then developed, and furthermore post-baked so that a resist layer 11 having an opening with a predetermined size is formed as shown in FIG. 1B. The longitudinal layer 4 and the electrode layer 5 are etched by means of for example an ion milling technique using the resist layer as a mask so that the portions of the longitudinal bias layer and the electrode layer which are not covered with the resist layer 11 are removed. The resist layer 11 is then removed. As a result, as shown in FIG. 1C, a narrow space or gap having a width equal to the desired track width TW is produced.

Figure 1D:
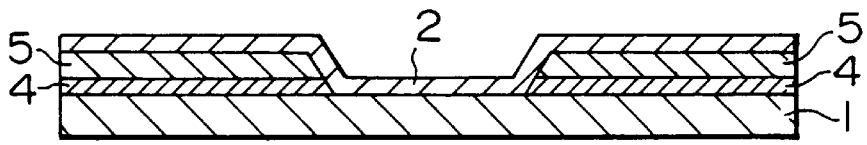
Figure 2A:
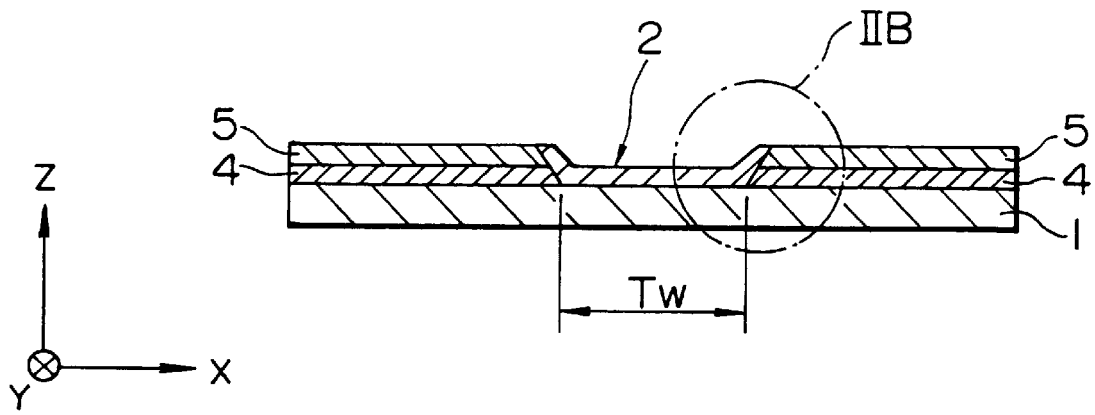
FIG. 2A is a cross-sectional view of a thin-film magnetic head according to the first embodiment.

Then, as shown in FIG. 1D, a three-layer film 2 having a uniform thickness is formed in the space having the width TW created by removing the longitudinal bias layer 4 and the electrode 5 and also formed on the upper surface of the electrode layer 5. As shown in an enlarged fashion in FIG. 2B, the three-layer film 2 consists of, from bottom to top, a magnetoresistance effect layer 2c, a non-magnetic material layer (shunt layer) 2b, and a transverse bias layer (soft magnetic layer: SAL layer) 2a. The magnetoresistance effect layer 2c is made of for example a Ni—Fe based material, the non-magnetic material layer 2b is made of for example Ta, and the transverse bias layer 2a is made of for example an Fe—Ni—Nb based material.

In the above process, although the three-layer film 2 may be formed directly on the non-magnetic material layer (lower gap layer) 1 in the gap-length part TW on which neither the longitudinal bias layer 4 nor the electrode layer 5 is present, it is desirable that a tantalum (Ta) film having a bcc crystal structure (body-centered cubic crystal structure) be formed in the gap-length part TW so that the tantalum film serves as an underlying layer of the three-layer film 2. If the Ta film having the bcc structure is provided under the magnetoresistance effect layer (Ni—Fe layer) 2c or the bottom layer of the three-layer film 2, it is possible to reduce the specific resistance of the magnetoresistance effect layer 2c. This reduces the shunting current flowing into layers other than the magnetoresistance effect layer 2c.

Figure 1E:
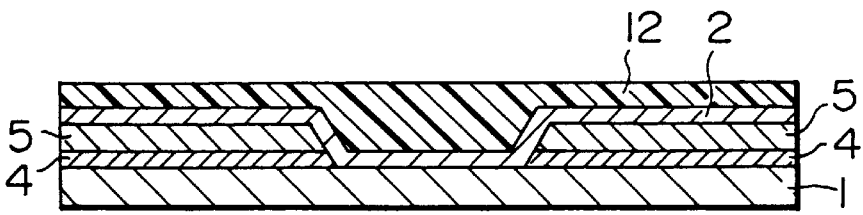
Figure 1F:
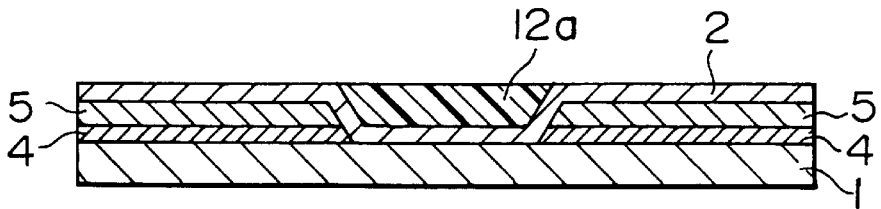

Then, a resist layer 12 is formed on the three-layer film 2 as shown in FIG. 1E. If a resist material is coated on the structure shown in FIG. 1D using a spin coating technique or the like, the recessed portion of the three-layer film 2 is filled with the resist material, and thus the resist layer 12 having a flat surface is obtained. The resist layer is then removed except for the portion 12a embedded in the recess as shown in FIG. 1F. In the above process, the resist layer 12 is removed by a predetermined constant thickness using for example an etch back technique so that the entire resist layer on the three-layer film 2 is removed except for the resist portion 12a embedded in the recess.

The portion of the three-layer film 2, which has become exposed after the removal of the resist layer 12a, is removed by means of for example an ion milling technique thereby obtaining a completed thin-film magnetic head such as that shown in FIG. 2A.

Figure 2B:
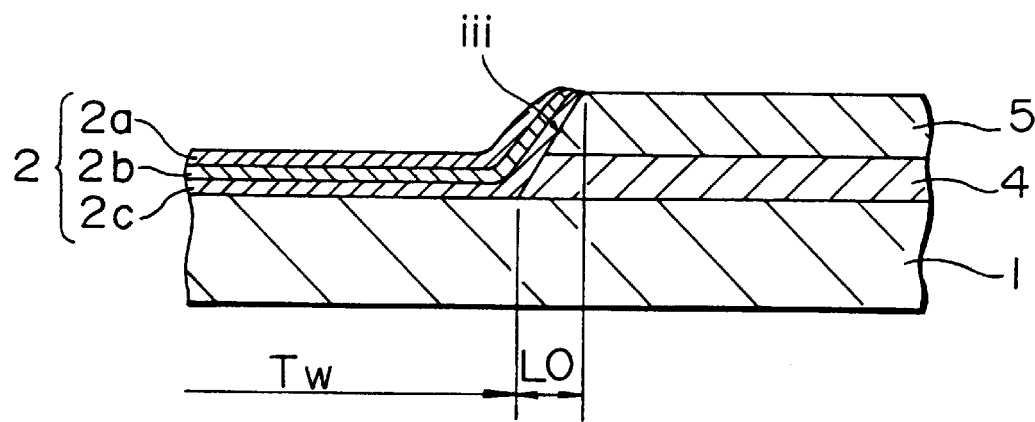
FIG. 2B is an enlarged cross-sectional view illustrating the part denoted by IIB in FIG. 2A.

In the thin-film magnetic head obtained in this way, the three-layer film 2 is formed on a slanted plane (iii) formed on each side of the longitudinal bias layer 4 and the electrode layer 5 while substantially none of the three-layer film 2 is formed on the surface of the electrode layer 5, as shown in FIG. 2B.

The slanted planes (iii) of the longitudinal bias layer 4 and the electrode layer 5 are formed as follows. First, in the process step shown in FIG. 1B, the width of the portions to be removed is defined by the resist layer 11, and then these portions of the electrode layer 5 and the longitudinal bias layer 4 are actually removed by means of for example the ion milling technique. In this process, the gap length TW can be precisely set to a desired value. Besides, it is easy to control the angle of the slanted plane (iii). It is also possible to obtain a rather small length L0 of the slanted plane (iii) in the X-direction.

In the structure shown in FIG. 2B, both the magnetoresistance effect layer 2c and the longitudinal bias layer 4 are located at the bottom layer, and the magnetoresistance effect layer 2c within the gap length TW is parallel to the longitudinal bias layer 4. Therefore, if the longitudinal bias layer 4 is formed so that it has magnetic anisotropy only in the X-direction, it becomes possible to effectively apply a longitudinal bias field (hard bias field) in the X-direction to the magnetoresistance effect layer 2c. Thus, it is not necessary for the longitudinal bias layer 4 to have isotropic magnetic characteristics. This makes it easier to form the longitudinal bias layer 4. Furthermore, the longitudinal bias layer 4 and the magnetoresistance effect layer 2c are both located at similar vertical positions. This ensures that the longitudinal bias layer 4 magnetizes the magnetoresistance effect layer 2c in the X-direction into a single magnetic domain.

Figure 13:
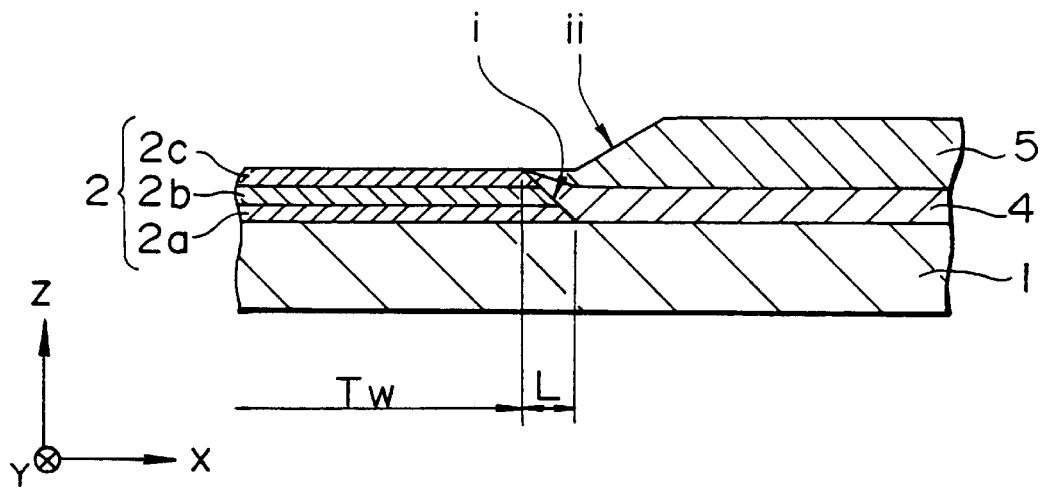
FIG. 13 is an enlarged cross-sectional view illustrating the part denoted by XIII in FIG. 12D.

Furthermore, over the entire slanted plane (iii), there are provided both the magnetoresistance effect layer 2c and the transverse bias layer 2a in parallel positions along the Z-direction. In other words, the transverse bias layer 2a has no portions protruding in the X-direction beyond the ends of the magnetoresistance effect layer 2c, unlike the conventional structure shown in FIG. 13. In this structure, even if the transverse bias layer 2a protrudes beyond the ends of the magnetoresistance effect layer 2c, the length of the protruding portions will be small enough, since the length L0 of the slanted plane (iii) is small. Therefore, unlike the conventional thin-film magnetic heads, the transverse bias layer has no portions which have independent sensitivity to the leakage magnetic field from a magnetic recording medium, and thus it is possible to reduce the Barkhausen noise.

Furthermore, in the slanted plane regions (iii), the end portions of the magnetoresistance effect layer 2c are located on the respective end sides of the longitudinal bias layer 4. This ensures that the magnetoresistance effect layer 2c has good magnetic coupling with the longitudinal bias layer 4. Therefore, there is no need to form the longitudinal bias layer 4 to an unnecessarily great thickness. After obtaining the structure shown in FIG. 2B, an upper gap layer and an upper shielding layer are formed on both the three-layer film 2 and the electrode layer 5. Since the longitudinal bias layer 4 is thin, it is possible to reduce the total layer thickness in the Z-direction. As a result, it becomes possible to reduce the magnetic gap length determined by the dimensions along the Z-direction of the upper and lower gap layers. This means that the resultant thin-film magnetic head can reproduce high-density signals.

In the structure according to the present embodiment, as shown in FIG. 2B, both the electrode layer 5 and the longitudinal bias layer 4 are in direct contact with the magnetoresistance effect layer 2c. As a result, the detection current applied to the electrode layer 5 can flow into the magnetoresistance effect layer 2c with little shunting current into the transverse bias layer 2a.

FIGS. 3A to 3F illustrate a second embodiment of a thin-film magnetic head according to the present invention. FIG. 4A illustrates a completed thin-film magnetic head, and FIG. 4B illustrates, in an enlarged fashion, a part of the thin-film magnetic head shown in FIG. 4A. In each embodiment described below, the material of each layer is the same as that of each corresponding layer employed in the first embodiment described above.

Figure 3A:
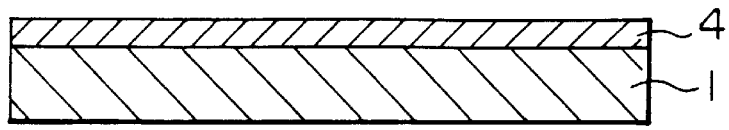
FIGS. 3A to 3F are cross-sectional views illustrating a production flow of a thin-film magnetic head according to a second embodiment of the present invention.
Figure 4A:
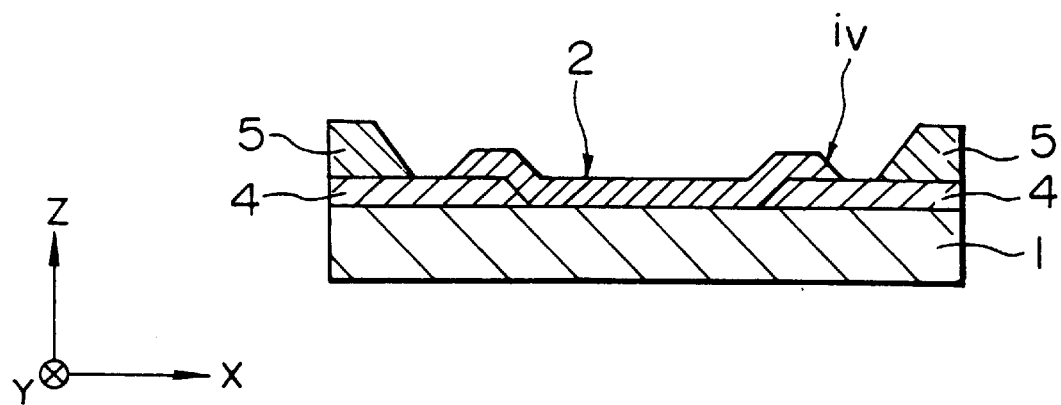
FIG. 4A is a cross-sectional view of a thin-film magnetic head according to the second embodiment.
Figure 4B:
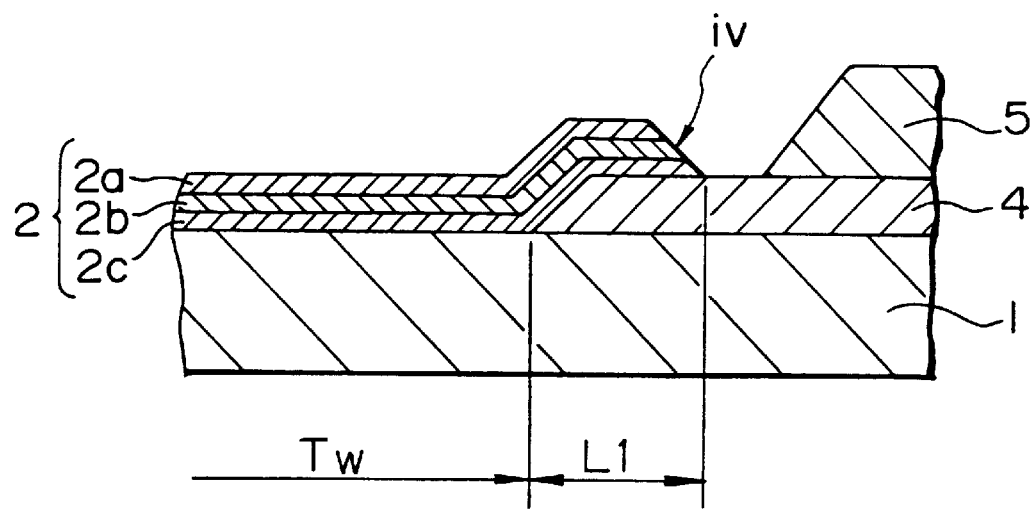
FIG. 4B is an enlarged cross-sectional view illustrating a part of the thin-film magnetic head shown in FIG. 4A.

In this second embodiment, only a longitudinal bias layer 4 having a constant thickness is formed on a non-magnetic material layer (lower gap layer) 1 as shown in FIG. 3A. A resist material is then coated on this longitudinal bias layer 4 and is subjected to an exposure and development process so that a resist pattern 11 having an opening similar to that shown in FIG. 1B is formed. The portion of the longitudinal bias layer 4 which is not covered with the resist layer 11 is removed by means of etching such as an ion milling technique thereby forming a narrow space (gap) having a predetermined width Tw in the longitudinal bias layer 4. This width Tw defines the track width. In this process using the etching technique with the resist layer 11, it is possible to precisely control the track width Tw.

Figure 3B:
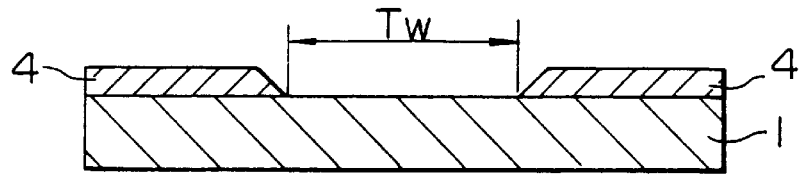
Figure 3C:
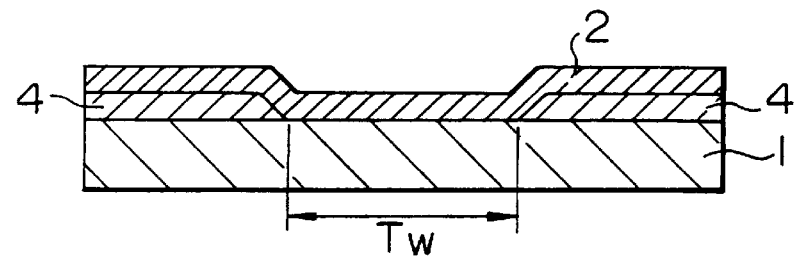

Then, as shown in FIG. 3C, a three-layer film 2 is formed on the track width region (space) Tw and also on the upper surface of the longitudinal bias layer 4. The three-layer film 2 consists of, from bottom to top, a magnetoresistance effect layer 2c, a non-magnetic material layer 2b, and a transverse bias layer 2a. The three-layer film 2 is formed so that each layer has a predetermined uniform thickness. As described above with reference to the first embodiment, if a Ta film having the bcc structure is formed in the track width region Tw so that it serves as an underlying layer of the three-layer film 2, it is possible to reduce the specific resistance of the magnetoresistance effect layer 2c.

Figure 3D:
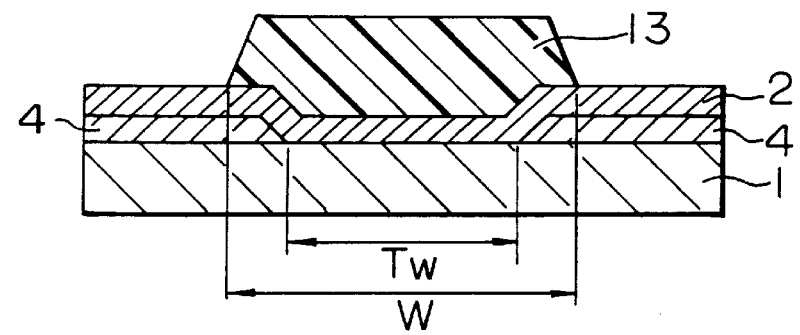
Figure 3E:
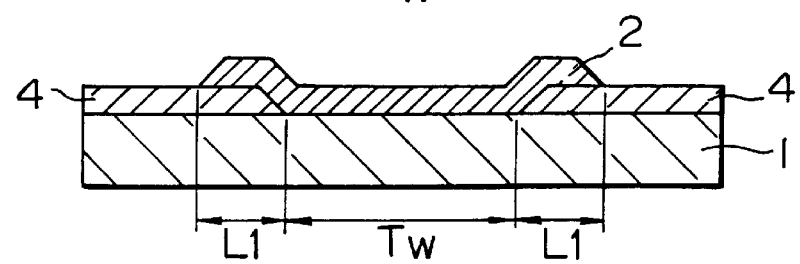

A resist material is then coated on the three-layer film 2 over its entire surface. The resist material is exposed to light through a mask, and then developed so that a resist patten 13 having a width W slightly greater than the track width Tw is formed as shown in FIG. 3D. The exposed portion of the three-layer film 2 (i.e., the portion not covered with resist layer 13) is removed by means of etching such as an ion milling technique as shown in FIG. 3E. As a result, the three-layer film 2 remains only in the gap (having the width equal to the track width Tw) in the longitudinal bias layer 4 and also in small areas on the longitudinal bias layer 4.

According to the above process, the three-layer film 2 shown in FIG. 3E can be formed so that it has precise dimensions corresponding to the width W of the resist pattern 13. As described above, the width W of the resist pattern 13 is slightly greater than the track width Tw so that the three-layer film 2 has end portions with a small width L1 extending beyond the ends of the track width Tw, wherein the width L1 can be controlled precisely by controlling the size of the resist pattern 13.

Figure 3F:
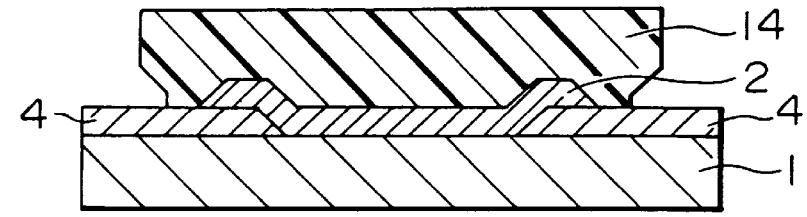

Then as shown in FIG. 3F, a resist layer 14 is formed on the three-layer film 2 and also on narrow parts of the longitudinal bias layer 4 at both sides of the three-layer film 2. This resist layer 14 can be formed as follows. First, a resist material is coated on the three-layer film 2 and on the longitudinal bias layer 4. The resist material is then exposed to light through a mask and then developed. Then, an electrode material is sputtered on the above structure. If the resist layer 14 is then removed, an electrode layer 5 is formed on the longitudinal bias layer 4 at locations slightly apart from the three-layer film 2 as shown in FIGS. 4A and 4B.

In the thin-film magnetic head produced in the process described above, since both the longitudinal bias layer 4 and the magnetoresistance effect layer 2c are located at the bottom layer, these layers have good magnetic coupling, and a hard bias field is effectively applied from the longitudinal bias layer 4 to the magnetoresistance effect layer 2c thereby ensuring that the magnetoresistance effect layer 2c is magnetized in the X-direction into a single magnetic domain. The track width Tw can be precisely defined by etching the longitudinal bias layer using the ion milling technique or the like. Furthermore, there is no need to form the longitudinal bias layer 4 to an unnecessarily great thickness, and it is possible to achieve a small gap length.

Furthermore, as shown in FIG. 4B, the three-layer film 2 extends in the X-direction beyond the ends of the track width Tw by an amount of L1 so that the ends of the three-layer film 2 reach locations on the surface of the longitudinal bias layer 4. The length L1 of the portions of the three-layer film 2 extending beyond the ends of the track width Tw, and the angle of the slanted planes (iV) at both ends of the three-layer film 2 can be controlled precisely by the ion milling (etching) process using the resist layer 13 shown in FIGS. 3D to 3E. Therefore, unlike the conventional technique shown in FIG. 13, the transverse bias layer (soft magnetic layer) 2a has no parts extending in the X-direction beyond the ends of the magnetoresistance effect layer 2c and thus the transverse bias layer 2a has no parts having independent sensitivity to a magnetic field. As a result, the Barkhausen noise decreases.

Furthermore, in this thin-film magnetic head, the electrode layer 5 is separated from the three-layer film 2 so that a detection current applied to the electrode layer 5 can flow via the longitudinal bias layer 4 into the magnetoresistance effect layer 2c with little shunting current into the transverse bias layer 2a.

Figure 5A:
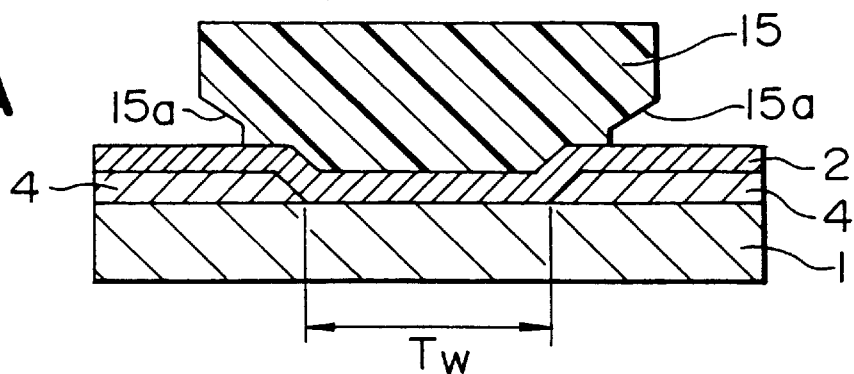
FIGS. 5A to 5C are cross-sectional views illustrating a production flow of a thin-film magnetic head according to a third embodiment of the present invention.
Figure 5B:
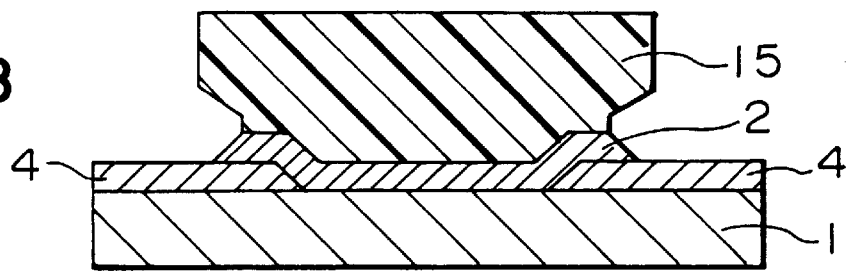

FIGS. 5A and 5B are cross-sectional views illustrating a production process of a thin-film magnetic head according to a third embodiment of the invention.

Figure 5C:
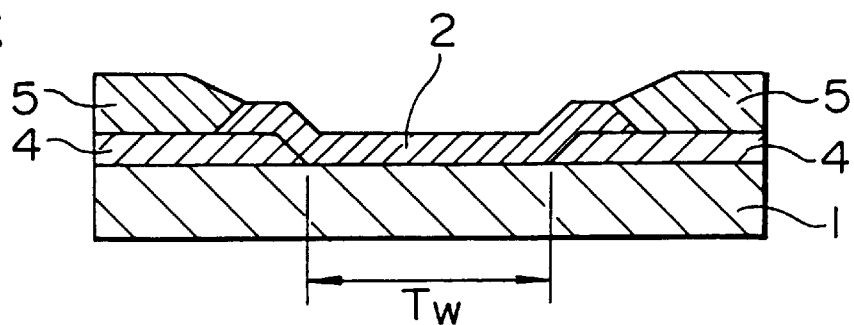

FIG. 5C is a cross-sectional view of a completed thin-film magnetic head. A part of the thin-film magnetic head shown in FIG. 5C is shown in an enlarged fashion in FIG. 6.

In this third embodiment, the process steps shown in FIGS. 3A, 3B, and 3C are the same-as those in the second embodiment described above. That is, after forming a longitudinal bias layer 4 on a non-magnetic material layer (lower gap layer) 1, the longitudinal bias layer 4 is partially removed by means of the ion milling technique so that a narrow space (gap) having a width equal to the track width Tw is formed in the longitudinal bias layer 4. A three-layer film 2 is then formed thereon over the entire surface of the structure. The three-layer film 2 consists of a magnetoresistance effect layer 2c located at the bottom, a non-magnetic material layer 2b in the middle, and a transverse bias layer (soft magnetic layer) 2a at the top. It is also desirable that a tantalum film having the bcc structure be formed in the track width region Tw so that it serves as an underlying layer of the magnetoresistance effect layer 2c.

Then as shown in FIG. 5A, a resist layer 15 is formed on the three-layer film 2. This resist layer 15 is formed by coating a resist material having a predetermined uniform thickness on the three-layer film 2, and then exposing the resist to deep-UV light through a mask, and finally developing the resist material. The resist layer has undercuts 15a, 15a at its both sides. Then as shown in FIG. 5B, the exposed portion of the three-layer film 2 (i.e., the portion not covered with resist layer 15) is removed by means of etching such as an ion milling technique. A electrode material is then sputtered, and finally the resist layer 15 is removed.

As a result, as shown in FIG. 5C, an electrode layer 5 is formed on the longitudinal bias layer 4 wherein the electrode layer 5C has a shape corresponding to the shape of the undercuts 15a, 15a of the resist layer 15, and the both ends of the electrode layer 5 are in contact with the respective ends of the three-layer film 2.

Figure 6:
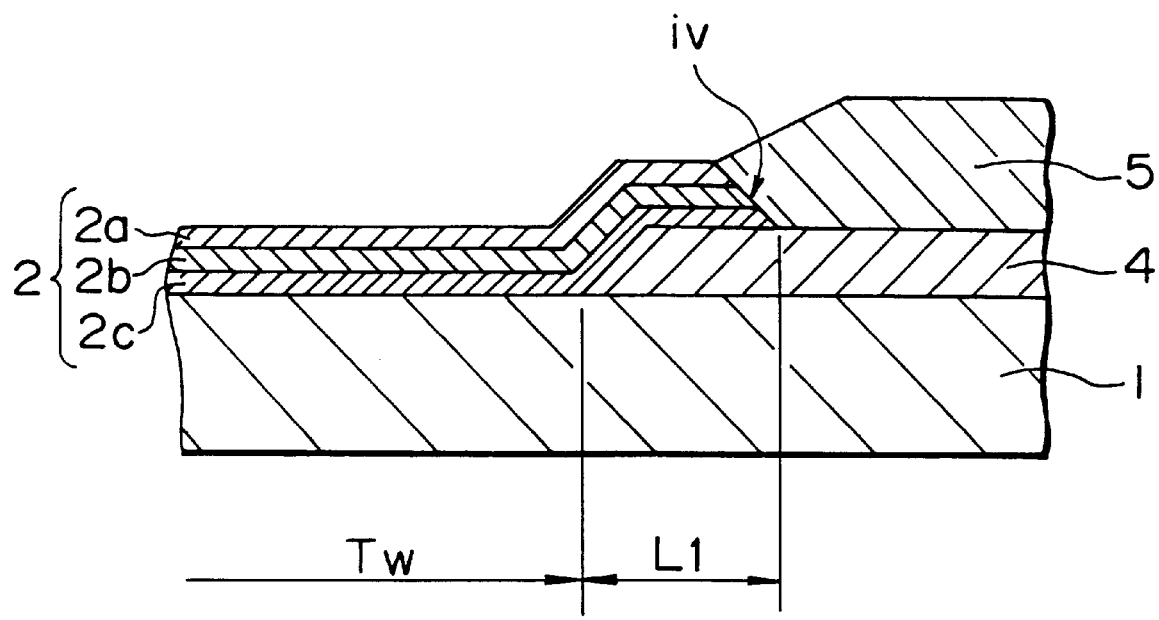
FIG. 6 is an enlarged cross-sectional view partially illustrating the thin-film magnetic head according to the third embodiment.

As can be seen from comparison between the structure according to the third embodiment shown in FIG. 6 and that according to the second embodiment shown in FIG. 4B, the third embodiment differs from the second embodiment only in that the electrode layer is in direct contact with the three-layer film 2. In the third embodiment, as shown in FIG. 6, the track width Tw is defined precisely, and the longitudinal bias layer 4 can have good magnetic coupling with the magnetoresistance effect layer 2c. Furthermore, it is possible to precisely control the length L1 of the portions of the three-layer film 2 extending beyond the ends of the track width Tw and also the angle of the slanted planes (iV) as in the second embodiment shown in FIG. 4.

Furthermore, the transverse bias layer 2a has no portions extending beyond the ends of the magnetoresistance effect layer 2c, and a detection current is applied from the electrode layer 5 to the magnetoresistance effect layer 2c so that the detection current flows through the entire length of the magnetoresistance effect layer 2c thereby ensuring that the transverse bias layer 2a is magnetized over its entire length by the magnetic field in the Y-direction from the magnetoresistance effect layer 2c. As a result, unlike the conventional structures, the transverse bias layer 2a has no portions having independent sensitivity to a magnetic field, and thus it is possible to reduce the Barkhausen noise.

Figure 7A:
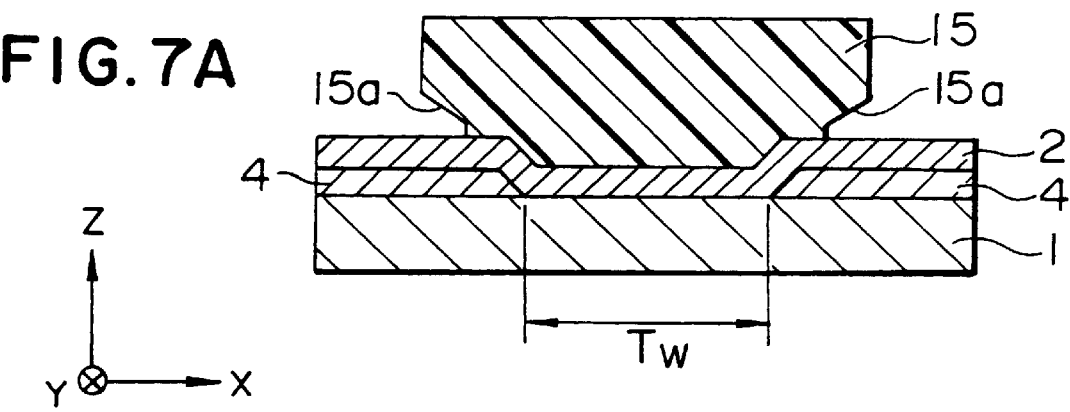
FIGS. 7A to 7C are cross-sectional views illustrating a production flow of a thin-film magnetic head according to a fourth embodiment of the present invention.
Figure 7B:
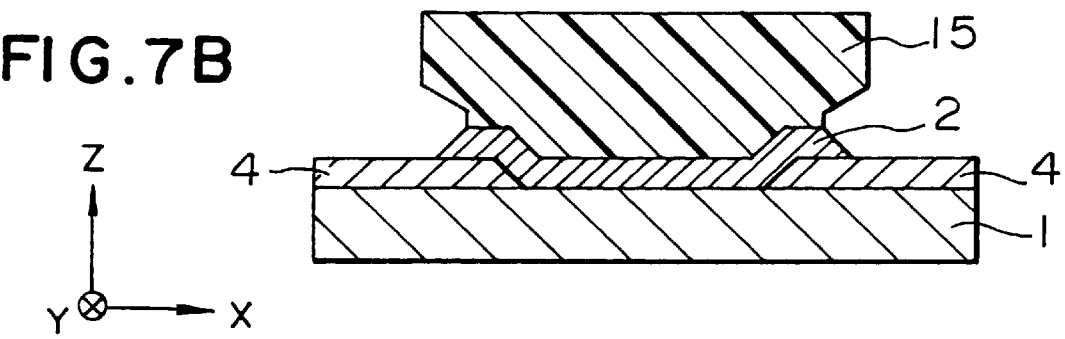
Figure 7C:
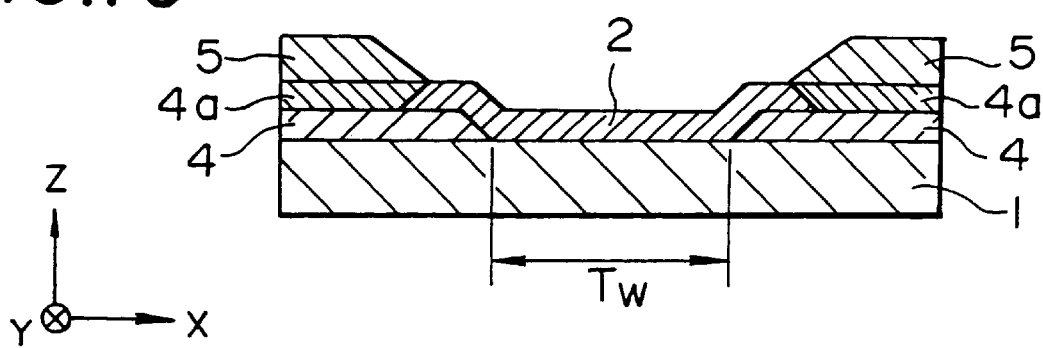

FIGS. 7A and 7B are a cross-sectional view illustrating a production process of a thin-film magnetic head according to a fourth embodiment of the invention. FIG. 7C is a cross-sectional view of a completed thin-film magnetic head, wherein a part of the thin-film magnetic head shown in FIG. 7C is shown in an enlarged fashion in FIG. 8.

In this embodiment, the processes shown in FIGS. 7A and 7B are the same as those shown in FIGS. 5A and 5B.

That is, after forming a longitudinal bias layer 4 on a non-magnetic material layer 1, the longitudinal bias layer 4 is partially removed by means of the ion milling technique so that the track width Tw is defined in the longitudinal bias layer 4. A three-layer film 2 is then formed thereon. Furthermore, a resist layer 15 having undercuts 15a, 15a is formed, and the three-layer film 2 is etched by the ion milling technique using the resist layer 15 as a mask.

In this embodiment, as shown in FIG. 7C, after the three-layer film 2 has been partially removed by the ion milling, a hard magnetic material (Co—Pt based material) which is the same as that of the longitudinal bias layer is sputtered so that the longitudinal bias layer 4a is formed on the longitudinal bias layer 4 made of the same material. Then, an electrode layer 5 is formed thereon.

Figure 8:
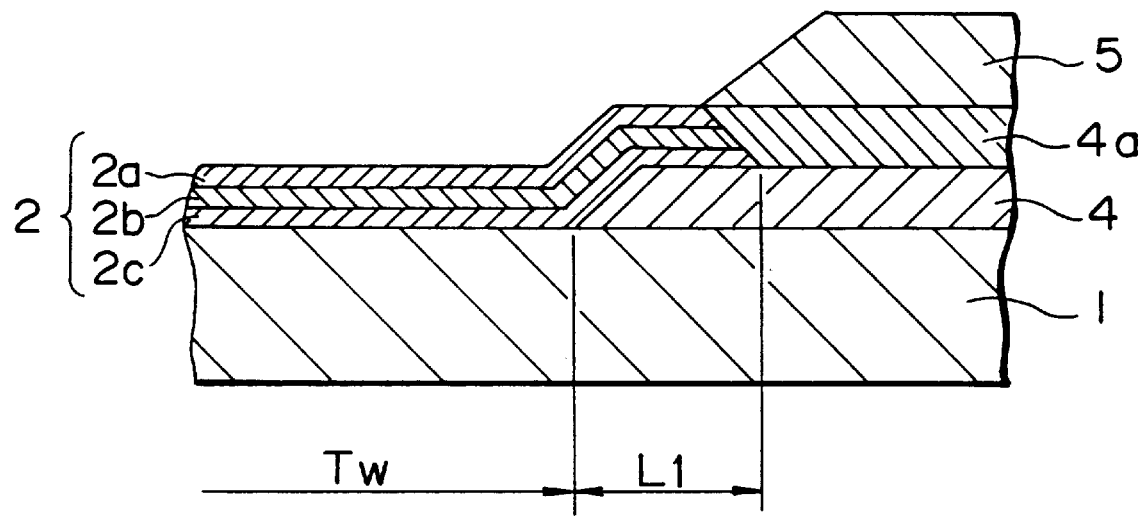
FIG. 8 is an enlarged cross-sectional view partially illustrating the thin-film magnetic head according to the fourth embodiment.

In the completed structure shown in FIG. 8, the layers 4 and 4a form a single layer acting as a hard bias layer magnetized in the X-direction. As a result, the magnetoresistance effect layer 2c is magnetized in the X-direction into a single magnetic domain over its entire length. Thus, the Barkhausen noise is reduced to a low level.

The structure shown in FIG. 8 is the same as that shown in FIG. 6 except for the contacting manner of the longitudinal bias layer, and thus the thin-film magnetic head according to the fourth embodiment can offer advantages similar to those of the third embodiment.

In each of second through fourth embodiments, if an upper gap layer and an upper shielding layer are successively formed on the three-layer film 2, a thin-film magnetic head having a final structure is obtained.

Figure 9:
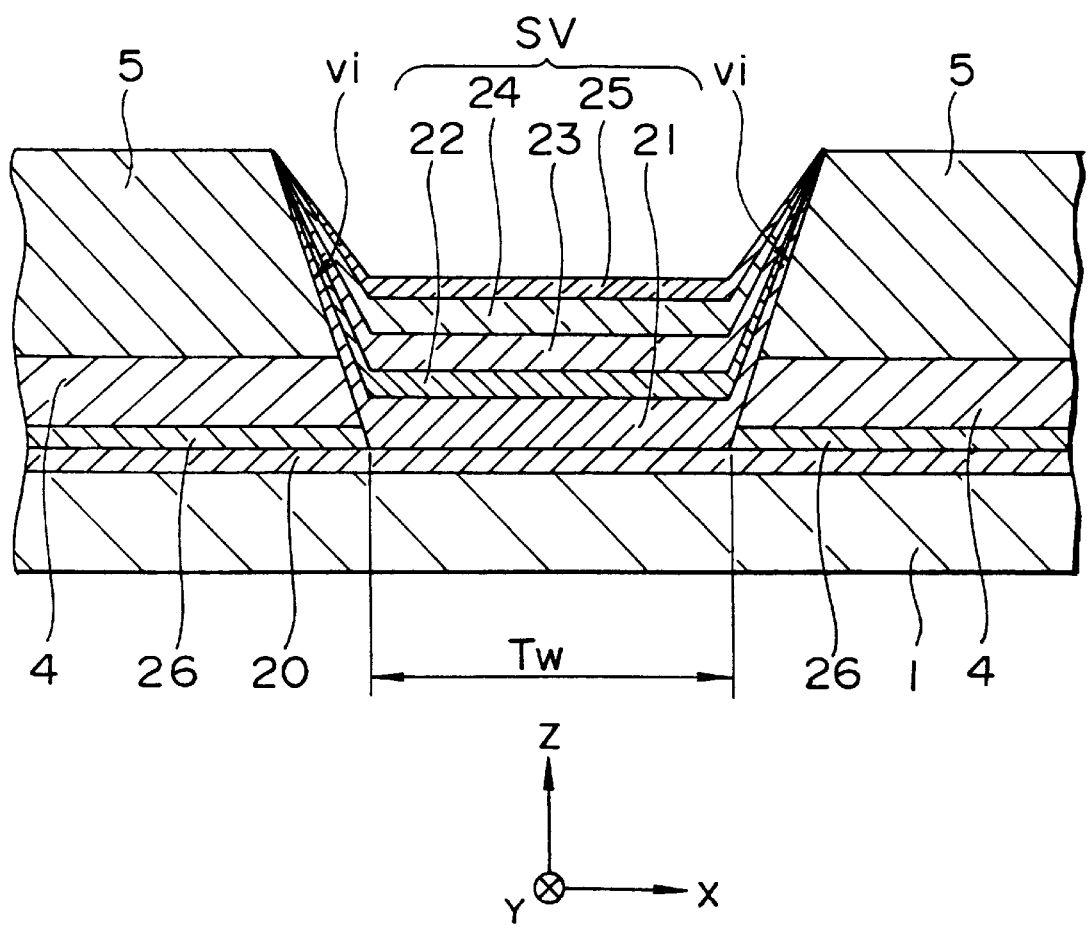
FIG. 9 is a cross-sectional view of a thin-film magnetic according to a fifth embodiment of the invention.

FIG. 9 is a front view of a fifth embodiment of a thin-film magnetic head of the spin valve type according to the invention. In this thin-film magnetic head, a magnetic recording medium moves in the Z-direction, while the leakage magnetic field (external magnetic field) from a magnetic recording medium points in the Y-direction. A lower non-magnetic layer 20 made of for example Ta (tantalum) is formed on a non-magnetic material layer 1 made of a non-magnetic material such as $Al_2O_3$ (aluminum oxide). The lower non-magnetic layer 20 of Ta ensures that when a free magnetic layer 21 is formed on it, crystal of the free magnetic layer 21 is uniformly oriented in the same direction, and the free magnetic layer 21 has a low specific resistance.

In the track width region Tw, a spin valve layer SV is formed on the lower non-magnetic layer 20 wherein the spin valve layer SV consists of five layers including, from bottom to top, a free magnetic layer 21, a non-magnetic conductive layer 22, a fixed magnetic layer 23, an antiferromagnetic layer 24, and an upper non-magnetic layer 25. The free magnetic layer 21 and the fixed magnetic layer 23 are made of an Ni—Fe (nickel-iron) alloy, the non-magnetic conductive layer 22 is made of Cu (copper), the antiferromagnetic layer 24 is made of an alloy such as Fe—Mn (iron-manganese), Ni—Mn (nickel-manganese), or Pt—Mn (platinum-manganese), and the upper non-magnetic layer 25 is made of for example Ta. The antiferromagnetic layer 24 serves as a bias layer for magnetizing the fixed magnetic layer 23 in the Y-direction (the upward direction perpendicular to the drawing plane) into a single magnetic domain, wherein the fixed magnetic layer 23 is magnetized in the Y-direction via the anisotropic exchange coupling at the interface between the antiferromagnetic layer 24 and the fixed magnetic layer 23.

Figure 14:
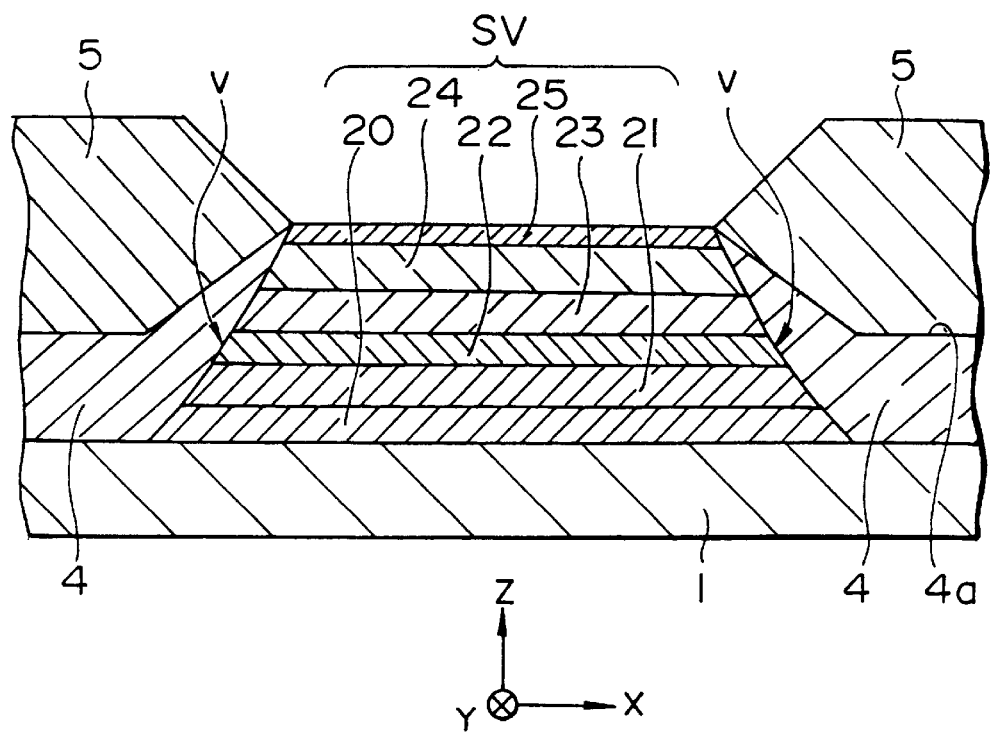
FIG. 14 is a cross-sectional view of a thin-film magnetic head according to another conventional technique.

At both sides of the track width region Tw, an underlying film 26 of Cr (chromium). is formed directly on the lower non-magnetic layer 20. The underlying film 26 of Cr ensures that a longitudinal bias layer 4 having improved magnetic characteristics can be formed on the underlying film 26. After forming the longitudinal bias layer 4 of Co—Pt (cobalt-platinum) on the underlying film 26, an electrode layer 5 such as Cu, Cr, or W (tungsten) is further formed thereon. The contacting interfaces (Vi) of the longitudinal bias layer 4 and the electrode layer 5 are formed in such a manner that the distance between the contacting interfaces increases with the position from bottom to top. The longitudinal bias layer 4 is in contact at the contacting interfaces (Vi) only with the free magnetic layer 21. Therefore, in this structure, unlike the conventional structures, no unnecessary magnetic field from the longitudinal bias layer 4 is applied to the fixed magnetic layer 23. Furthermore, since the bias layer 4 is in contact only with the free magnetic layer 21, the longitudinal bias layer 4 exhibits stable magnetic characteristics as opposed to the conventional structures shown in FIG. 14 in which the longitudinal bias layer is in contact with a plurality of layers and thus the magnetic characteristics change from part to part in response to the change in the material from layer to layer with which the longitudinal bias layer is in contact.

Both the longitudinal bias layer 4 and the electrode layer 5 are formed on the non-magnetic material layer 1 so that they are flat and parallel to each other. The longitudinal bias layer 4 has a substantially constant thickness in the regions near the contacting interfaces (vi) as well as in the other region. As a result, in the regions near the contacting interfaces (vi), the demagnetizing field induced in the longitudinal bias layer 4 has a uniform magnitude and points in the same direction. This ensures that the longitudinal bias layer 4 is magnetized in the X-direction.

In the thin-film magnetic head shown in FIG. 9, the longitudinal bias layer 4 has a uniform thickness and the entire longitudinal bias layer 4 is permanently magnetized in the same direction along the X-axis. Furthermore, the longitudinal bias layer 4 is in contact only with the free magnetic layer 21. Thus, the free magnetic layer 21 is more completely magnetized in the X-direction by the longitudinal bias layer 4. Furthermore, the fixed magnetic layer 23 is magnetized in the Y-direction (the upward direction perpendicular to the drawing plane) via the anisotropic exchange coupling with the antiferromagnetic layer 24. The fixed magnetic layer 23 is not affected by the longitudinal bias layer 4, and thus the fixed magnetic layer 23 is magnetized in the Y-direction in a stable fashion. A steady-state current flows from the electrode layer 5 via the longitudinal bias layer 4 into each layer constituting the spin valve layer SV in the X-direction. If an external magnetic field in the Y-direction is applied, the magnetization direction of the free magnetic layer 21 is changed. The electric resistance of the spin valve layer SV changes depending on the magnetization direction of the free magnetic layer 21 and the magnetization direction of the fixed magnetic layer 23. The change in the electric resistance is detected as the change in the voltage drop, and thus the leakage magnetic field from a magnetic recording medium is detected. In this thin-film magnetic head, since the magnetization directions of the free magnetic layer 21 and the fixed magnetic layer 23 are stable as described above, the Barkhausen noise in the detected signal is very low and thus it is possible to achieve high-accuracy detection.

FIGS. 10A to 10F illustrate a process flow of the thin-film magnetic head shown in FIG. 9.

Figure 10A:
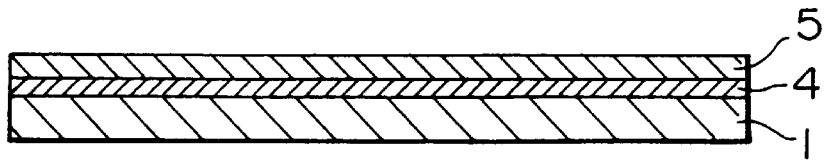
FIGS. 10A to 10F are cross-sectional views illustrating a production flow of a thin-film magnetic head according to the fifth embodiment of the present invention.

First, as shown in FIG. 10A, a longitudinal bias layer 4 and an electrode layer 5 are successively formed on a non-magnetic material layer 1. Although it is not shown in FIG. 10, a lower non-magnetic layer 20 is formed on the non-magnetic material layer 1, and an underlying film 26 is formed under the longitudinal bias layer 4. If the longitudinal bias layer 4 is formed before forming the spin valve layer SV, it is possible to obtain a flat longitudinal bias layer 4 having a uniform thickness.

Figure 10B:
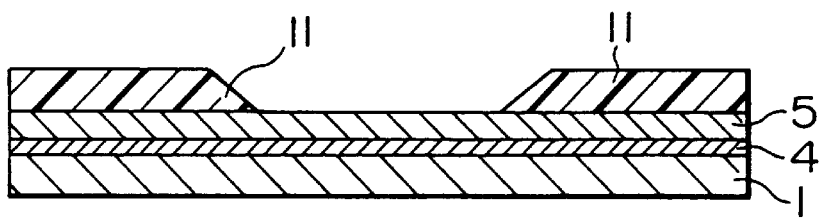

A resist material is then coated on the electrode layer 5 using a spin coating technique. After pre-baking the resist material, the resist material is exposed to light through a mask. The resist is developed and then post-baked thereby forming a resist layer 11. As a result of the above process, a window (opening) having a width equal to the track width Tw is formed in the resist layer 11 as shown in FIG. 10B. The electrode layer 5 and the longitudinal bias layer 4 are etched by means of for example ion milling using the resist layer 11 as a mask so that the electrode layer 5 and the longitudinal bias layer 4 in the region (track width region) not covered with resist layer 11 are removed.

Figure 10C:
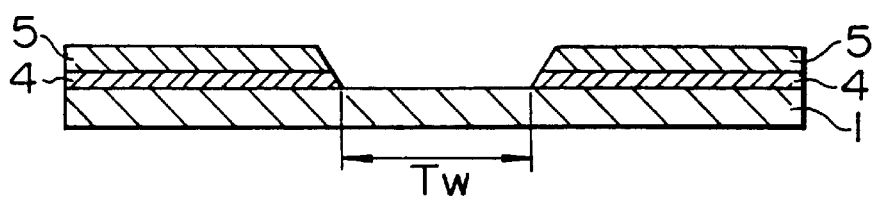

After completion of the etching process, the resist layer 11 is removed. As a result, the structure shown in FIG. 10C is obtained. In this structure, a recessed portion is formed in the electrode layer 5 and the longitudinal bias layer 4 after the electrode layer 5 and the longitudinal bias layer 4 have been partially removed, wherein the bottom width of the recessed portion defines the track width Tw.

Figure 10D:
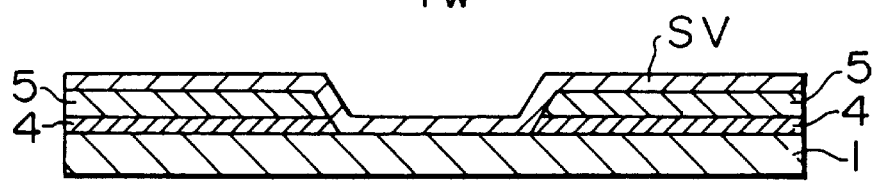

Then as shown in FIG. 10D, a spin valve layer SV consisting of five layers, including a free magnetic layer 21 at the bottom, an upper non-magnetic layer 25 at the top, and other layers in the middle, is formed by means of sputtering. In the track width region Tw, the spin valve layer SV is formed on the non-magnetic material layer 1 and the lower non-magnetic layer 20 while the spin valve layer SV is formed on the electrode layer 5 in the other regions.

Figure 10E:
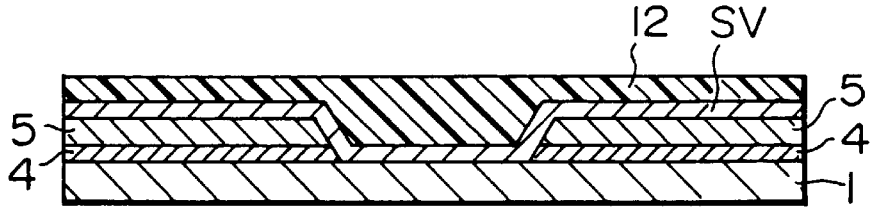
Figure 10F:
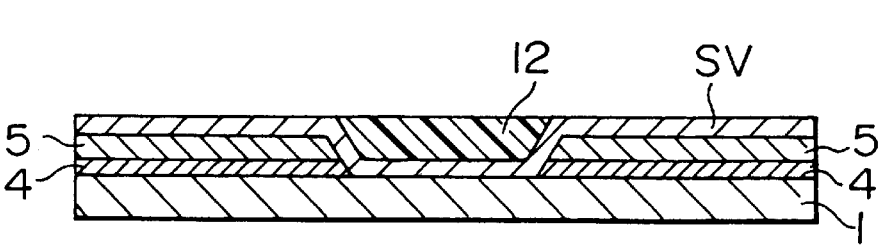

Furthermore, a resist layer 12 is formed on the spin valve layer SV over its entire surface in such a manner that the recessed portion or the track width region Tw is filled with the resist material as shown in FIG. 10E. The resist layer 12 is then etched by means of for example an etch back technique so that the entire resist layer 12 except in the recessed portion is removed. As a result, as shown in FIG. 10F, the recessed portion is smoothed with the resist material embedded therein, and thus a flat surface structure having substantially no irregularities is obtained. The spin valve layer SV is then etched by the ion milling technique thereby removing the spin valve layer SV in the exposed area not covered with resist layer 12 (the entire area except the Tw region). After completion of the etching process, the resist layer 12 remaining in the recessed portion is removed. Thus, a complete thin-film magnetic head having the structure shown in FIG. 9 is obtained.

In the production technique described above with reference to FIG. 10, since the longitudinal bias layer 4 is formed before forming the spin valve layer SV, it is possible to obtain a longitudinal bias layer 4 having a uniform thickness. Furthermore, in this production technique, it is possible to form an underlying film such as Cr 26 before depositing th e longitudinal bias layer 4 thereby improving the magnetic characteristics of the longitudinal bias layer 4. Furthermore, in this production technique, a recessed portion is formed first in the longitudinal bias layer 4 and the conductive layer 5, and then the spin valve layer SV is formed in the recessed area. This ensures that the free magnetic layer 21, which is the bottom layer of the spin valve layer SV, is in good contact with the longitudinal bias layer 4.

Figure 11:
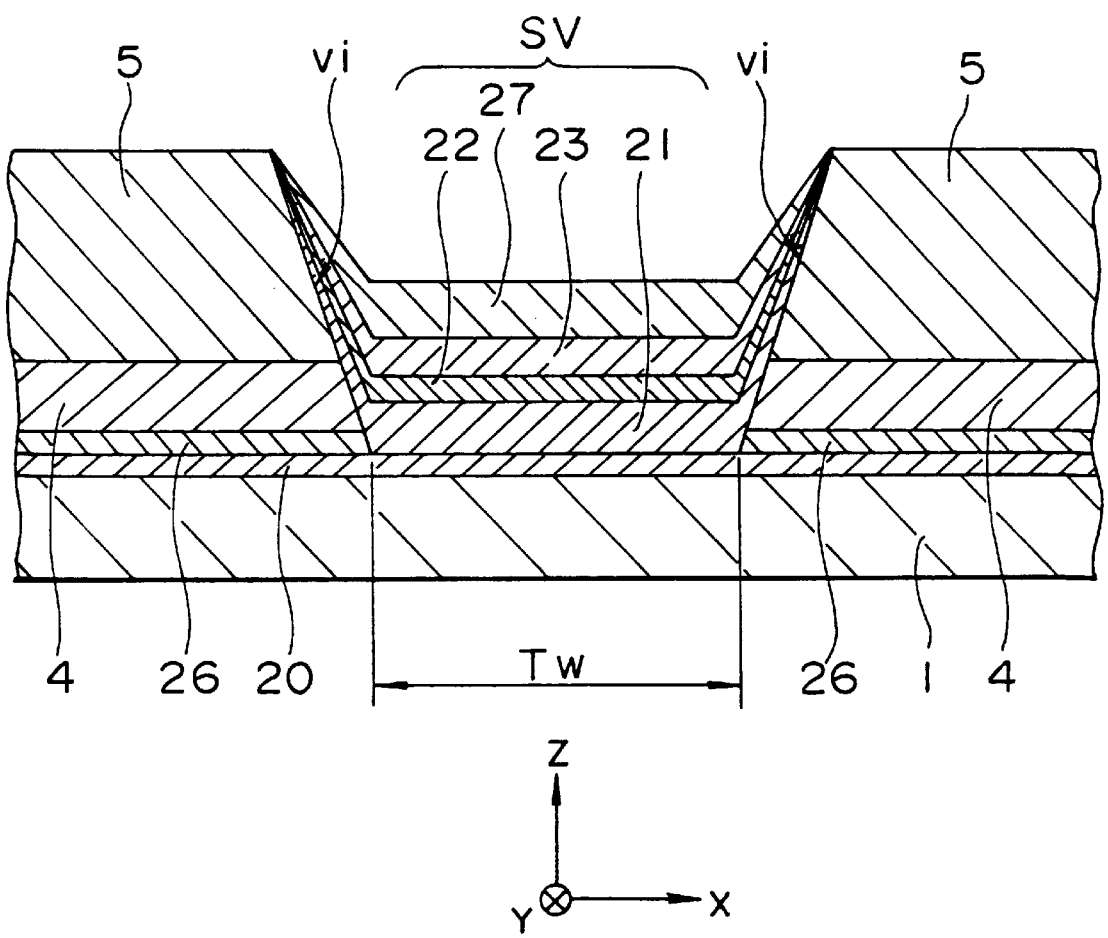
FIG. 11 is a cross-sectional view of a thin-film magnetic according to a sixth embodiment of the invention.
Figure 12A:
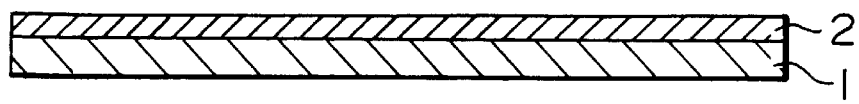
FIGS. 12A to 12D are cross-sectional views illustrating a production flow of a thin-film magnetic head according to a conventional technique.
Figure 12B:
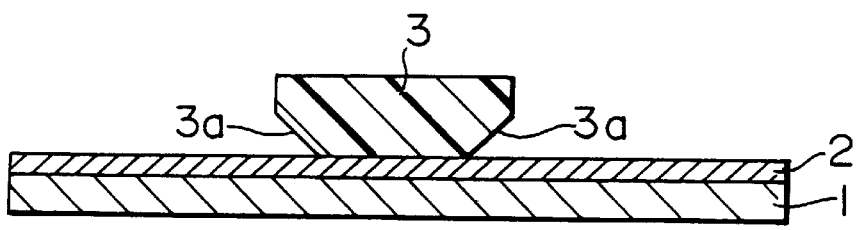
Figure 12C:
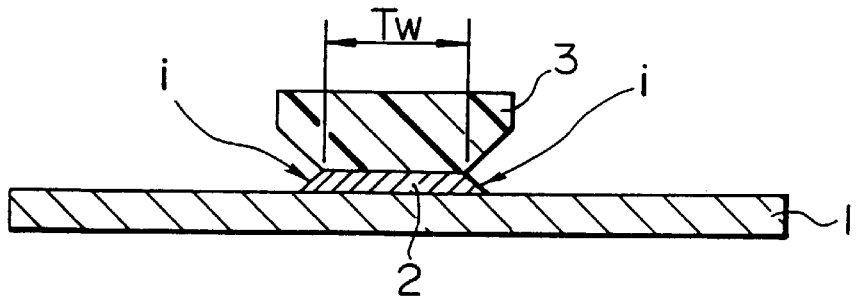
Figure 12D:
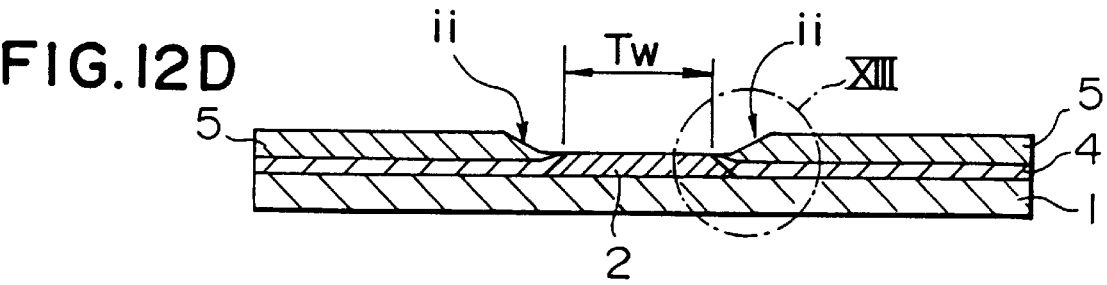

FIG. 11 illustrates a sixth embodiment of a thin-film magnetic head according to the invention.

In this thin-film magnetic head, as shown in FIG. 11, there is provided a spin valve layer SV consisting of four layers including a free magnetic layer 21, a non-magnetic conductive layer 22, a fixed magnetic layer 23 and a bias layer 27. The bias layer 27 is provided to magnetize the fixed magnetic layer 23 in an upward direction perpendicular to the drawing plane of FIG. 11, wherein the bias layer 27 is made of $\alpha$—$Fe_2O_3$ (iron oxide). The $\alpha$—$Fe_2O_3$ layer magnetizes the fixed magnetic layer 23 made of an Ni—Fe alloy into the Y-direction via the anisotropic exchange coupling with the fixed magnetic layer 23. Furthermore, the direct contact between the $\alpha$—$Fe_2O_3$ layer and the fixed magnetic layer 23 enhances the coercive force Hc of the fixed magnetic layer 23, and thus makes it possible for the fixed magnetic layer 23 to be permanently magnetized in the Y-direction. In this embodiment, as described above, $\alpha$—$Fe_2O_3$ is employed as the bias layer 27 thereby achieving the stable magnetization of the fixed magnetic layer 23 and also achieving a reduction in the Barkhausen noise.

Furthermore, since $\alpha$—$Fe_2O_3$ is excellent in corrosion resistance, no protection layer is needed as opposed to the structure shown in FIG. 9 in which the upper non-magnetic layer 25 of Ta is provided at the top. This simple structure allows the spin valve layer SV to be formed in a short time.

What is claimed is:

1. A method of producing a thin-film magnetic head, comprising the steps of:

forming a longitudinal bias layer over a base material;

forming an electrode layer on the longitudinal bias layer;

removing sections of said longitudinal bias layer and electrode layer to form a narrow space having a predetermined width between opposing first and second portions of said longitudinal bias layer and said electrode layer;

successively forming a magnetoresistance effect layer, a non-magnetic layer, and a transverse bias layer, in said space and also on said first and second portions of said electrode layer; and removing said magnetoresistance effect, non-magnetic and transverse bias layers from the first and second portions of said electrode layer, thereby leaving portions of the magnetoresistance effect, non-magnetic and transfers bias layers in said space.

2. A method of producing a thin-film magnetic head, comprising the steps of:

forming a longitudinal bias layer over a base material;

removing a section of said longitudinal bias layer and electrode layer to form a narrow space having a predetermined width between first and second portions of said longitudinal bias layer;

successively forming a magnetoresistance effect layer, a non-magnetic layer, and a transverse bias layer in said space; and removing said magnetoresistance effect, non-magnetic and transverse bias layers from the first and second portions of said longitudinal layer; thereby leaving portions of the magnetoresistance effect, non-magnetic and transfers bias layers in said space; and forming an electrode layer over said first and second portions of said longitudinal bias layer.

3. A method of producing a thin-film magnetic head, according to claim 2, wherein said electrode layer is separated from said magnetoresistance effect, non-magnetic and transverse bias layers.

4. A method of producing a thin-film magnetic head, according to claim 2, wherein a second longitudinal bias layer is formed on said longitudinal bias layer, wherein the second longitudinal bias layer and said longitudinal bias layer are formed from a common material, wherein said second longitudinal bias layer is in contact with said magnetoresistance effect, non-magnetic and transverse bias layers, and wherein the electrode layer is formed on said second longitudinal bias layer.

5. A method of producing a thin-film magnetic head, comprising the steps of:

forming a longitudinal bias layer on a base material;

forming an electrode layer on the longitudinal bias layer;

removing a portion of said electrode layer and longitudinal bias layer to form a space;

forming a free magnetic layer over the base material in the space;

forming a non-magnetic layer on the free magnetic layer;

forming a fixed magnetic layer on the non-magnetic layer; and forming a bias layer over the fixed magnetic layer such that said bias layer magnetizing the fixed magnetic layer in a direction perpendicular to a direction in which the free magnetic layer is magnetized by the longitudinal bias layer, wherein only said free magnetic layer of said free magnetic layer, said fixed magnetic layer and said non-magnetic layer contacts said longitudinal bias layer.

* * * * *